(12) United States Patent
Ghassemzadeh

(10) Patent No.: US 9,410,066 B2
(45) Date of Patent: *Aug. 9, 2016

(54) DRILLING LOST CIRCULATION MATERIAL

(71) Applicant: Schlumberger Technology Corporation, Sugar Land, TX (US)

(72) Inventor: Jaleh Ghassemzadeh, Grand Prairie (CA)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 21 days.

This patent is subject to a terminal disclaimer.

(21) Appl. No.: 13/934,179

(22) Filed: Jul. 2, 2013

(65) Prior Publication Data

US 2013/0296199 A1   Nov. 7, 2013

Related U.S. Application Data

(62) Division of application No. 12/631,934, filed on Dec. 7, 2009, now abandoned.

(30) Foreign Application Priority Data

Dec. 11, 2008 (EP) ..................................... 08171405

(51) Int. Cl.
   *C09K 8/035* (2006.01)
   *C09K 8/504* (2006.01)
   *C09K 8/506* (2006.01)
   *C09K 8/516* (2006.01)
   *E21B 21/00* (2006.01)

(52) U.S. Cl.
   CPC .................. *C09K 8/035* (2013.01); *C09K 8/506* (2013.01); *C09K 8/5045* (2013.01); *C09K 8/516* (2013.01); *E21B 21/003* (2013.01); *C09K 2208/08* (2013.01)

(58) Field of Classification Search
   None
   See application file for complete search history.

(56) References Cited

U.S. PATENT DOCUMENTS

| | | |
|---|---|---|
| 2,610,149 A | 9/1952 | Van Dyke |
| 2,779,417 A | 1/1957 | Clark, Jr. et al. |
| 3,574,099 A | 4/1971 | Ryals et al. |
| 4,247,403 A | 1/1981 | Foley et al. |
| 4,474,665 A | 10/1984 | Green |
| 4,579,668 A | 4/1986 | Messenger |
| 5,004,553 A | 4/1991 | House et al. |
| 5,071,575 A | 12/1991 | House et al. |

(Continued)

FOREIGN PATENT DOCUMENTS

| | | |
|---|---|---|
| WO | 93/18111 | 9/1993 |
| WO | 03/048266 | 6/2003 |

(Continued)

*Primary Examiner* — John J Figueroa
(74) *Attorney, Agent, or Firm* — Irina Markova; Michael L. Flynn; Tim Curington

(57) ABSTRACT

An engineered composition for reducing lost circulation in a well includes a mixture of coarse, medium and optional fine particles, and a blend of long fibers and short fibers. The long fibers are rigid and the short fibers are flexible. The long fibers form a tridimensional mat or net in the lost-circulation pathway that traps the mixture of particles and short flexible fibers to form a mud cake. The mixture of particles and blend of fibers may be added to water based and oil-based drilling fluids. The composition, size, and concentration of each component of the mixture of particles and blend of fibers may be fine-tuned for each application.

20 Claims, 2 Drawing Sheets

(56) References Cited

U.S. PATENT DOCUMENTS

| | | |
|---|---|---|
| 5,076,944 A | 12/1991 | Cowan et al. |
| 5,377,760 A | 1/1995 | Merrill |
| 6,323,158 B1 | 11/2001 | Burts, Jr. |
| 6,399,545 B1 | 6/2002 | Rose |
| 6,790,812 B2 | 9/2004 | Halliday et al. |
| 6,889,780 B2 | 5/2005 | Whitfill et al. |
| 7,226,895 B2 | 6/2007 | Xiang |
| 2003/0195120 A1 | 10/2003 | Halliday et al. |
| 2004/0123985 A1 | 7/2004 | Whitfill et al. |
| 2004/0129460 A1 | 7/2004 | MacQuoid et al. |
| 2005/0194141 A1 | 9/2005 | Sinclair et al. |
| 2005/0269080 A1* | 12/2005 | Cowan .................... 166/250.14 |
| 2007/0034410 A1 | 2/2007 | Xiang |
| 2007/0056730 A1 | 3/2007 | Keese et al. |
| 2008/0045421 A1* | 2/2008 | Nelson et al. ................. 507/204 |

FOREIGN PATENT DOCUMENTS

| | | |
|---|---|---|
| WO | 2004/101704 | 11/2004 |
| WO | 2005/110942 | 11/2005 |
| WO | 2005/121500 | 12/2005 |

\* cited by examiner

DRILLING LOST CIRCULATION MATERIAL

CROSS REFERENCED APPLICATION

This application is a divisional application of U.S. application Ser. No. 12/631,934, filed on Dec. 7, 2009 and published on Jun. 17, 2010 as US20100152070, the entire content of which is hereby incorporated by reference in its entirety.

BACKGROUND

The statements in this section merely provide background information related to the present disclosure and may not constitute prior art.

Drilling fluids have a number of functions, including but not limited to, lubricating the drilling tool and drill pipe which carries the tool, providing a medium for removing formation cuttings from the well to the surface, counterbalancing formation pressure to prevent the inflow to the wellbore of gas, oil, and/or water from permeable or porous formations which may be encountered at various levels as drilling progresses, preventing the loss of drilling fluids to void spaces and to permeable or porous formations, maintaining hole stability prior to setting the casing, minimizing formation damage, and holding the drill cuttings in suspension, especially in the event of a shutdown in drilling and interruption of pumping of the drilling mud.

Drilling fluid additives in time can form a thin, low permeability filter cake (mud cake) that can seal openings in formations to reduce the unwanted influx of fluids or the loss of drilling fluids to permeable formations. The mud cake forms when the drilling fluid contains particles that are approximately the same size as or have diameters greater than about one third of the pore diameter (or the width of any openings such as induced fractures) in the formation being drilled. Drilling fluid additives can also increase the stability of the wellbore.

The drilling fluid must circulate in the wellbore (down the drill pipe and back up the annulus) in order to perform all of the desired functions to allow the drilling process to continue. Therefore, drilling fluid should remain in the wellbore all the time, otherwise well control and caving in of the wellbore is immediate. Sometimes penetration of undesirable formation conditions causes substantial to severe losses of the drilling fluid to the formation. The features responsible for such losses can be related to small to large fissures, or natural or induced fractures in the formation; the losses may also be through highly porous rock.

Fluid loss is a common occurrence in drilling operations. Drilling fluids are designed to seal porous formations intentionally while drilling; this occurs as the result of suction of the fluid onto the permeable surface (pressure greater in the well than in the formation) and the creation of a mud cake to seal a porous formation during drilling and for the purpose of wellbore stabilization. Some fluid will be lost through the mud cake and fluid loss control additives are required.

However, the loss of fluids (the whole slurry) to the formation can reach an extent such that no mud cake can be created to secure the surface and create an effective barrier. In extreme situations, when the borehole penetrates a fracture in the formation through which most of the drilling fluid may be lost, the rate of loss may exceed the rate of replacement. Drilling operations may have to be stopped until the lost circulation zone is sealed and fluid loss to the fracture is reduced to an acceptable level. In the worst case, the consequences of this problem can be loss of the well.

Curing lost circulation while drilling is the subject of many publications, patents, and research for development of materials, reactions, and techniques is an ongoing process. Still the most greener and desirable treatment is the physical blockage with specific solid material. The benefit of the solids of any nature added to different types of mud to cure losses is the possibility of separating them from the mud on the mud shakers and other equipment for general conditioning of mud for proper circulation in well. However, curing losses effectively and quickly is still a matter of concern for many companies and operators. The volumes of mud loss and the amounts of lost circulation material used are both very great.

Over the years numerous techniques have been developed in order to cure or to reduce low to high lost circulation of mud to the wellbore. Under these conditions, the normal procedure is to add fluid loss agents. The mechanism is to change the rheological properties of the drilling mud in order to increase the resistance to flow of the fluid to formation. This alone may decrease the losses while drilling to an acceptable level. However, when it comes to intolerable losses it is now traditional to add various bulk materials known as LCMs. Such prior art lost circulation materials are selected from different groups of material in the form of flake (or laminated), granular, and fibrous materials. Major materials mentioned are the cheap wastes of the other industries that are used as LCM.

One of the traditional treatments to cure losses is the use of Lost Circulation Materials (LCMs). As is well known to experts, conventional LCMs are often not adequately efficient. One problem with conventional LCMs is that they are generally waste products from other industries such a wood, paper, textile, agriculture, car, and different polymer products industry. These products are not engineered to be effective at blocking the loss zone. Not all materials are capable of building a blocking material with low permeability. The material may not only be dislodged and allow further fluid loss, but also may not pack in the required way to be able to block losses. Regarding fibers, the situation is similar; not all fibers are capable of blocking fluid loss under given conditions, and selection and use of the wrong fiber can cause great complications in mixing and pumping and ultimately with no blocking effect to cure losses.

The many LCMs that have been added to drilling fluids include corn stalks, wood shavings, flake cellophane, and chopped up paper (U.S. Pat. No. 2,610,149); rice hulls, shredded paper (U.S. Pat. No. 2,779,417); processed and shaped wet pulp residue with solid and fiber content with particle sizes between 200-1000 micron with 70% inorganic filler (kaolinite clays and calcium carbonate) and 30% cellulous fiber with length:diameter ratio of 2:1 (WO 93/18111); whole corncobs or the woody ring portion of corncobs (U.S. Pat. No. 4,247,403); sized coca bean shell material with a particle size distribution of 0.15 to 9.5 mm (2 to 100 mesh) (U.S. Pat. No. 4,474,665); ground walnut shells, cellophane, and shredded wood (U.S. Pat. No. 4,579,668); a blend of rice fraction (40-90% by weight of drilling fluid with size finer than 65 mesh to about 85 mesh, corn cobs, at least one ground wood fiber, ground nut shell, ground paper, and shredded cellophone (U.S. Pat. No. 6,323,158 B1); oat hulls and one or more of ground corn cobs, cotton, citrus pulp, and ground cotton burrs (U.S. Pat. No. 5,004,553 and U.S. Pat. No. 5,071,575); ground cotton burrs along with one or more of ground oat hulls, ground corn cobs, cotton, ground citrus pulp, ground peanut shells, ground rice hulls, and ground nut shells (U.S. Pat. No. 5,076,944); ground tannin-containing organic waste product including grape pumice, tomato pumice, yellow pine bark, yellow pine, wood bark, and the like (U.S. Pat. No. 6,399,545); and sugar cane fibers or bagasse, flax, straw, ground hemp, cellophane strips, ground redwood fibers, ginned cotton fibers. Many of the natural products are at least partially fibrous in nature.

Organic and inorganic, natural and synthetic fibers have been used along with other particles and/or polymeric treatments. For example, in a cure for lost circulation, fibers were added to aqueous solutions of partially hydrolyzed polyacrylamide (U.S. Pat. No. 5,377,760). In another example, a high fluid loss spotting pill included a carrier fluid, a LCM containing acidizable mineral particulates, preferably calcium carbonate (fine and coarse particles and fine flakes) along with acid-soluble mineral fibers, preferably fine fibers such as extruded mineral wool having a diameter of 4 to 20 microns, preferably from about 5 to 6 microns and a length of fiber about 200 microns, preferably 8 to 25 microns (US 2003/0195120 and U.S. Pat. No. 6,790,812). In yet another example, a loss circulation combination contained alkali metal silicate and water-insoluble particulate material as an integral component of a water-based drilling fluid system and a quantity of water-soluble activating agent effective to reduce the pH of the water-based drilling fluid system low enough to cause precipitation of the silicate; the water-insoluble particulate materials included cellulose fibers selected from corn cobs, nut shells, seeds, pith, and lignin and had sizes from about 0.025 to about 2 mm (about 10 to about 500 mesh) (US 2007/0034410 and U.S. Pat. No. 7,226,895). Coconut coir in the form of a mixture of short fibers, flakes, granular pieces, and powder from the coconut husk has been used as an LCM in drilling fluid to prevent loss of drilling fluid into fractures in rock formations (US 2004/0129460). Finally, glass fibers or novoloid fibers in an amount of 1.43 to 17.12 kg/m3 (0.5 to 6 lbm/bbl) have been mixed with solid particles of less than 300 microns (WO 2004/101704 and US 2007/0056730). References listed above are incorporated herein by reference thereto.

Despite all these efforts, there is still a need for a precisely engineered material that can quickly and efficiently reduce severe lost circulation.

SUMMARY

A first embodiment is a composition for reducing lost circulation in a well; the composition contains a mixture of coarse, medium and optional fine particles, and contains a blend of long fibers and/or short fibers. The fine particles preferably have an average particle size of from about 5 to about 15 microns. As an example, about 10 weight percent of the fine particles are smaller than about 1 micron and about 10 weight percent of the fine particles are larger than about 30 microns. The fine particles optionally have an average particle size of from about 5 to about 10 microns. Preferably, about 10 weight percent of the medium particles are smaller than about 20 microns and about 10 weight percent of the fine particles are larger than about 150 microns. The medium particles, as an example, have an average particle size of from about 20 to about 150 microns. Preferably, about 10 weight percent of the coarse particles are smaller than about 5 microns and about 10 weight percent of the coarse particles are larger than about 1500 microns. As an example, the coarse particles have an average particle size of from about 300 to about 1200 microns. The mixture of particles preferably contains from about 0 to about 15 weight percent fine particles, about 20 to about 40 weight percent medium particles, and about 40 to about 60 weight percent coarse particles. The particles are selected from alkaline earth carbonates, poly-paraphenyleneterephthalamide, mica, rubber, polyethylene, polypropylene, polystyrene, poly(styrene-butadiene), fly ash, silica, mica, alumina, glass, barite, ceramic, metals and metal oxides, starch and modified starch, hematite, ilmenite, microspheres, glass microspheres, magnesium oxide, gilsonite, sand, and mixtures of these materials. The fine particles may suitably be calcium carbonate. The medium particles may suitably be rubber, mica, calcium carbonate polyparaphenyleneterephthalamide, and mixtures of these materials. The coarse particles may suitably be mica, silica, calcium carbonate and mixtures of these materials. The mixture of particles may be about 8 to about 12 weight percent fine calcium carbonate, about 30 to about 40 weight percent poly-paraphenyleneterephthalamide, calcium carbonate, mica and mixtures thereof, and about 45 to about 60 weight percent coarse calcium carbonate. Optionally, at least about 60 weight percent of the mixture of particles is acid-soluble. In other embodiments, the long fibers are rigid and the short fibers are flexible. The weight ratio of long fibers to short fibers is preferably from about 1:4 to about 4:1. The length ratio of long fibers to short fibers is preferably from about 1:1 to about 3:1. Optionally, at least a portion of the fibers is acid-soluble and more preferably all the fibers are acid-soluble. Optionally, at least a portion of the fibers is biodegradable. In other embodiments, the length of the long fibers is between about 8 and about 15 mm, the long fibers are organic, the long fibers include water-insoluble polyvinyl alcohol, and/or the short fibers include watersoluble polyvinyl alcohol. By water soluble here it has to be understood soluble in water at a temperature higher than the highest operating temperature. In yet other embodiments, the short fibers include a mixture of fibers of two different lengths, for example one type of fiber having an average length of from about 1 to about 2 mm and the second group of fibers having an average length of from about 3 to about 8 mm. Optionally, the short fibers may include a mixture of two different lengths of polyvinyl alcohol fibers; as examples, the two different lengths are in a weight ratio of from about 90:1 to about 1:90, the two different lengths are in a length ratio of from about 2 to about 6, or the two different lengths are in a length ratio of from about 2.5 to about 7. In other embodiments, the short fibers may include a mixture of multiple lengths of polyaramid fibers, the short fibers may include inorganic fibers (for example made from calcium oxide and silica). Preferably, the fibers are made of polyvinyl alcohol, polyamide, aramid, para-aramid, polylactic acid, polyglycolic acid, metals, painted metals, polymer-coated metals, hollow metals, hollow painted metals, hollow coated metals, polypropylene, polyethylene, polyester, polyamide, polyolefin, novoloid, phenol-aldehyde, nylon, rayon, extruded mineral wool, carbon, basalt, asbestos, and glass.

Another embodiment is a composition for reducing lost circulation in a well; the composition includes a mixture of coarse, medium and fine particles, a blend of long fibers and short fibers, and a water-based drilling fluid. The mixture of particles is preferably added to the drilling fluid at a concentration of from about 2.85 kg/m$^3$ to about 130 kg/m$^3$, for example at a concentration of from about 14 kg/m3 to about 60 kg/m$^3$. The blend of fibers is preferably added to the drilling fluid at a concentration of from about 14 kg/m$^3$ to about 42 kg/m$^3$. Optionally, at least a portion of the fibers is coated with a material that improves the dispersion of the fibers in the water-based drilling fluid. In one example, the long fibers include water-insoluble polyvinyl alcohol and the short fibers include polyaramid fibers. Preferably, the mixture of coarse, medium and fine particles, and the blend of long fibers and short fibers, is added at a total concentration of from about 2.85 kg/m$^3$ to about 142.5 kg/m$^3$.

Yet another embodiment is a composition for reducing lost circulation in a well; the composition includes a mixture of coarse, medium and fine particles, a blend of long fibers and short fibers, and an oil-based drilling fluid. The mixture of particles is preferably added to the drilling fluid at a concentration of from about 2.85 kg/m$^3$ to about 130 kg/m$^3$, for example at a concentration of from about 14 kg/m$^3$ to about 60 kg/m$^3$. The blend of fibers is preferably added to the drilling fluid at a concentration of from about 14 kg/m$^3$ to about 42 kg/m$^3$. The long fibers may suitably include para-aramid. The short fibers may suitably include para-aramid fibers and the long fibers may suitably include polyaramid fibers. In various embodiments, the long fibers may be about 8 to about 10 mm long, the long fibers may include polyaramid fibers, the long fibers may include polyvinyl alcohol fibers, the short fibers may include a mixture of two different lengths, the short fibers may include a mixture of multiple lengths of fibers, the short fibers may include inorganic fibers, and both the long fibers and the short fibers may include polyvinyl alcohol fibers. The mixture of coarse, medium and fine particles, and the blend of long fibers and short fibers, is preferably added at a total concentration of from about 2.85 kg/m$^3$ to about 142.5 kg/m$^3$.

Yet another embodiment is a composition for reducing lost circulation in a well; the composition includes a mixture of coarse, medium and fine particles, and a blend of two different rigid fibers. The different rigid fibers may include fibers of different length; the different rigid fibers may include fibers of different diameter. The different rigid fibers may suitably each include water-insoluble polyvinyl alcohol fibers.

Additional embodiments include methods of reducing lost circulation in a well. One such method involves adding a mixture of coarse, medium an optional fine particles, and adding a blend of long fibers and short fibers, to a drilling fluid. Another such method involves adding a mixture of coarse, medium and optional fine particles to the drilling fluid, adding short fibers to the drilling fluid, and adding long fibers to the drilling fluid; the concentration of the long fibers is increased during the treatment. Yet another method involves adding a mixture of coarse, medium and optional fine particles to the drilling fluid, adding short fibers to the drilling fluid, and adding long fibers to the drilling fluid; the length of the long fibers is increased during the treatment. Another method involves adding a mixture of coarse, medium and optional fine particles, and adding a blend of two different rigid fibers to the drilling fluid; the two different rigid fibers preferably have diameters of from about 0.05 mm to about 0.2 mm and lengths of from about 8 to about 15 mm.

DETAILED DESCRIPTION

Figure 1:
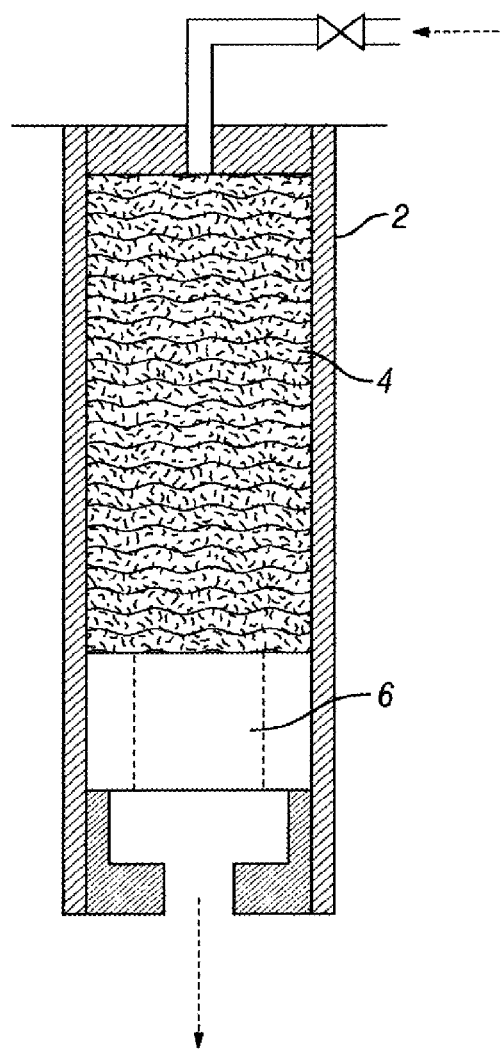
FIG. 1 shows the lost circulation testing apparatus.

It should be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventor appreciates and understands that any and all data points within the range are to be considered to have been specified, and that the inventor has possession of the entire range and all points within the range.

We classify losses in four categories. Seepage losses happen very slowly and can be confused with cutting removal at the surface. Seepage losses sometimes happen in the form of filtration to a highly permeable formation. They are characterized by losses of from about 0.16 to about 1.6 m$^3$/hr (about 1 to about 10 bbl/hr) of mud. If formation damage or stuck pipe is the primary concern, attempts should be made to cure losses before proceeding with drilling. Losses greater than seepage losses but less than about 16 m$^3$/hr (about 100 bbl/hr) are defined as partial losses. In almost all circumstances when losses of this type are encountered, regaining full circulation is required. Losses of mud at rates greater than about 16 m$^3$/hr (about 100 bbl/hr) are considered severe losses. As with partial losses, regaining full circulation is required. Traditional treatments for severe losses include spotting of conventional LCM pills and moving to plugs if conventional treatments are not successful. The fourth category is total losses.

We have found a composition and method that is suitable for decreasing or eliminating seepage losses and partial losses, and severe lost circulation in a drilling operation by blocking flow into permeable and/or fractured formations while drilling. The composition and method do not require a pH or temperature change. The composition and method are particularly applicable to wells having partial losses or severe losses. In the latter case the composition and method provides, in a first (primary) treatment, a temporary cure of severe losses. For greater assurance of a permanent and complete treatment, it is convenient for a driller then to place a second treatment, such as a cement plug. In that case the composition and method assure that the second treatment is effective. Additional benefits of the primary plugging by the (first) treatment are lower total treatment cost, less damage to the formation that would have caused a decrease in the stability of the formation, and decreases in further problems that may otherwise appear because of delays in treatment.

The present invention allows an immediate blockage of losses as soon as treatment places the new combination of fibers and particulate materials in front of the zone by a physical mechanism. The invention helps to block the fracture at the entrance or pinch of the fracture in a way that can handle the pressure in order to proceed with drilling well up to reaching intended target depth. Without wishing to be bound by any theory, the inventors believe that the long fibers can flow in the media based on rigid or springy motion and that the short fibers are capable of snake like motion with less entanglement. The long fibers enter the fracture and then align with the streamline of the mud or treatment flow and partition the fracture in order to trap the other particles to create a strong barrier against losses of mud to formation. The fiber selection plays an important role in this mechanism. Fibers should be compatible with each other and with the drilling fluid, and avoid decrease in fluidity of the mud or treatment media, preferably even have a synergy with mud or treatment fluid. Blend of fibers preferably shows synergy with to distribute uniformly into the treatment fluid.

The composition comprises blends of (a) at least two different fibers having specific and distinguishable individual characteristics along with (b) a specific blend of three different particle size ranges of particulate solids. One benefit of this treatment is that the solid and fiber content can be adjusted and evaluated with the mud carrier (for example oil-based or water-based) used in the treatment.

A number of different systems has been found that can be used with water-based and/or oil-based muds. The key to effective blockage is a properly engineered blend of at least two fibers having very different aspect ratios and flexibilities in combination with a specific blend of three sizes of solid particles. The presence of the fibers creates an effective three dimensional heterogeneous network that can be blocked effectively by solids having appropriate particle sizes to form a strong impermeable mud cake. In addition, fine flexible fibers have a strengthening effect on the generated mud cake that further consolidates the entrance of a fracture or of the pore throats of permeable or unconsolidated formations during creation of an internal filter cake as the result of leakage to the walls of the fracture. There is no need for the mud or the mudcake to gel or to set (as would a cement).

The composition and method may be used with water-based and/or oil based drilling fluids to eliminate problems associated from seepage losses to severe losses, in particular so that other permanent solutions are not required. For use in cases near the upper limit of severe losses, the treatment is recommended as a pretreatment before a more consolidated treatment. This use as a pre-treatment decreases the total cost, decreases damage to the formation, and increases the chances of an effective first placement of the secondary treatment (such as a cement plug or a reactive pill).

The fibers and solids are added to the drilling fluid (mud) in any order and with any suitable equipment to form the treatment fluid. Typically, the fluid containing the fibers and solids is mixed before pumping downhole. The blend of fibers may be added and mixed and then the mixture of solids added and mixed, or vice versa, or both fibers and solids may be added before mixing. Typically the treatment fluid is weighted to approximately the same density as the drilling mud to minimize migration of the treatment fluid and mixing with the drilling mud. A weighting material may optionally be added to the fluid, the fibers, or the solids at any point. The treatment fluid may be added in a discrete amount, for example as a pill, or may be added until lost circulation is satisfactorily reduced. The treatment fluid is spotted adjacent to the location of the lost circulation, if known, by methods known in the art.

The mixture of particles and blend of solids may be injected in several stages in which the relative amounts of particles, long fibers, and short fibers varies from stage to stage. Optionally, the length of the long particles may also be less than optimal and then be increased to the optimal length during the treatment. For example the concentration of long fibers may put at lower-than-optimal concentration of fiber in the first stage or stages of the treatment. A suitable low concentration may be determined by measuring the minimal effective blocking concentration of the blocking material for a specific fracture size and then using a concentration in the range of about 10 to about 90 percent of that minimal effective blocking concentration. For example, if the effective concentration of the rigid fiber to cure a 2 mm fracture of is about 8.56 kg/m$^3$ (about 3 lbm/bbl) then the low concentration may be selected from the range of about 0.856 to about 7.70 kg/m$^3$ (about 0.3 to 2.7 lbm/bbl) of the rigid fiber. The low concentration selected should be tested in the same equipment to validate the non-blocking effect of the treatment. The treatment with low concentration of the rigid fiber is followed with a treatment with an effective concentration of fibers capable of rapid blockage. As a result, treatment with the effective concentration blocks the fracture at or near the wellbore and the low concentration rigid fiber plugs the fracture at a bottleneck deeper in the fracture. In another case, the short fiber and rigid fiber concentrations may be decreased by a certain percentage that experimentally may be determined based on the concentration of fibers in an effective fiber concentration for blocking a certain fracture size. The concentrations of the fibers in the first fluid may, for example, be from about 5 to about 50 percent less than the effective minimal concentration of fibers. The concentrations of each fiber type may be reduced by the same amount or by different amounts. In yet another case, in addition to a change in the fiber concentration, the amount of the solid particles may also be decreased. The low concentration treatment may be designed in such a way that it blocks certain fracture sizes lower than the original fracture size. For example, the low concentration treatment may be designed to treat a 1 mm fracture and the following treatment may be designed to treat a 4 mm fracture. For example, for a 1 mm fracture with using zero to a low concentration of rigid fibers may be sufficient. When any of these strategies is followed, the treatment forms the blockage at least at two different depths in a fracture or in pores (one close to or at the wellbore and another at a different depth in the fracture or pores away from the wellbore) rather than only at the wellbore or close to the wellbore.

A suitable blend of fibers and solids is selected for a given mud and given conditions, such as but not limited to the mud type, the bottom hole temperature and the extent of losses being experienced. An effective concentration of each component, or a range of effective concentrations, may be identified by performing experiments such as those described below. Similarly, suitable compositions of particles and fibers, and suitable particle size ranges and fiber lengths may be identified by performing experiments such as those described below.

The composition and method may be used in any density mud; preferred densities are from about 1.1 to about 2.0 kg/L (about 9.2 to about 17 pounds per gallon (lbm/gal)). The solids volume fraction may range from about 4 percent to about 50 percent. The amounts and type of particles and fibers added may be chosen in a way that the added components do not change the mud weights or solids volume fractions very much. As high a particle concentration and/or as high a fiber concentration as can be handled by the on-site equipment may be used to help minimize penetration of the treatment fluid into the fluid loss pathway.

Water-based muds are typically slurries of clay solids and polymers; the concentrations and densities are adjusted to provide the specific properties required for drilling, well protection, temperature control, and the other mud functions. Oil-based muds may contain diesel, poly alpha olefins, modified esters and ethers, mineral oils, other hydrophobic materials, and mixtures of these. Oil-based muds may also be invert emulsions of oil in which up to 50% water is dispersed in the oil; the oil is the external phase and water is the internal phase. The composition may be added to drilling fluids in concentrations adjusted with respect to the mud specifications.

The blend of solid particles preferably consists of coarse, medium, and fine particles. The blend may be used with water-based and oil-based muds. The coarse particles in the blend are preferably coarse carbonates having an average particle sizes above about 300 microns and less than or equal to about 1200 microns. The carbonate is preferably calcium carbonate. The medium size particles are preferably poly-paraphenyleneterephthalamide powder, available from Teijin Aramid Company, Arnhem, The Netherlands. However, other materials may be used for these particles, for example any particles used in oilfield fluids, for example mica, calcium carbonate and cements. Calcium carbonate particles having an average particle size of about 130 microns may be used. The medium particles may also be a mixture, for example a mixture of calcium carbonate and from about 0 to about 95 percent poly-paraphenyleneterephthalamide. The fine particles are preferably microfine carbonate particles having sizes below about 10 microns. The main purpose of the fine particles is to facilitate metering and handling of the blend; the fine particles may be left out if the equipment can handle the blend of medium and coarse particles. If the fine particles must be used and can invade small formation pores, non-damaging particles should be used. The ratio of the coarse/medium/fine particles is preferably about 55/35/10 weight percent. The coarse particles may vary from about 40 to about 60 percent of the mixture of particles; the medium particles may vary from about 30 to about 40 percent of the mixture of particles; the fine particles may vary from about 8 to about 15 weight percent of the mixture. The particles may be selected by one skilled in the art from any types of particles used in muds and are not limited to calcium carbonate and polyparaphenyleneterephthalamide. Coarse particle preferably have a high hardness to improve resistance to pressure. Such hardness is typically between 50 to 200 Vickers. Medium particle may have lower hardness than the coarse particles.

Non-limiting examples of other suitable particles for use as components of the blend of solid particles include mica, rubber, polyethylene, polypropylene, polystyrene, poly(styrene-butadiene), fly ash, silica, mica, alumina, glass, barite, ceramic, metals and metal oxides, starch and modified starch, hematite, ilmenite, microspheres, glass microspheres, magnesium oxide, gilsonite, and sand. Mica is particularly suitable because it provides substantial friction. Cement and microcement are not normally used as one or more of the particles, but may be. If cement is present, it is less than about 50 weight percent, for example less than about 45 weight percent, of the weight of the particles. The particles are not normally in flake or platelet form. Suitable wetting agents may be used to ensure that the materials are oil-wettable in oil-based muds or water-wettable in water-based muds. Laboratory tests should be performed to ensure compatibility with the drilling fluid, that the fluid can transport the particles at the pumping rates used, and suitability for the size of the openings in the fluid loss pathways to be plugged.

The blend of fibers preferably contains fibers having different aspect ratios and different flexibilities. The blend is most commonly a blend of two fibers, or a blend of three fibers but blends of more fibers may be used. The fibers may optionally be a blend of different lengths of fibers. Preferably, at least one fiber type is rigid and the rest of the fibers are flexible. Preferably, the rigid fibers are longer than the flexible fibers. The length of the longest particles is limited only by the ability of the on-site equipment to accommodate and move the fibers, mix the fibers and fluid, and pump a fluid containing the fibers. Long rigid fibers may be effective alone at sufficient concentration for blocking some fluid loss pathways, but their efficacy is improved by the addition of short fibers; these may also be rigid but are more effective if flexible. Note that we define a "flexible" fiber as having a Young's Modulus of less than about 20 GPa (kN/mm$^2$) and a rigid fiber as having a Young's Modulus of greater than about 20 GPa. Note that the fiber lengths specified are not intended to be precise; fibers as received, or as cut to length, inevitably are a mixture of lengths distributed around the intended length.

In one preferred embodiment for water-based muds, the blend of fibers is composed of two types of fibers. One type of fiber is rigid and the other is flexible. The rigid fiber is preferably non-water-soluble polyvinyl alcohol. The second fiber may be selected from inorganic or organic fibers. The second fiber may itself be a mixture of fibers having the same diameter with different lengths or may have a single fixed fiber length and preferably may be selected from aramid polymers suitable for aqueous media and water-soluble polyvinyl alcohol polymers which are water-soluble at high temperature. In another preferred embodiment for water-based muds, the blend of fibers is composed of three fibers in which one fiber is an organic rigid long fiber and the other two fibers are inorganic and/or organic fibers (preferably both organic fibers) having different lengths. The fibers are generally cut to the appropriate lengths, by any method known in the art, from the as-received materials to provide the desired lengths. Note that fibers may be described here as "water soluble", "non-water-soluble", or "water-insoluble" because that is how they are described by manufacturers and suppliers; water solubility or insolubility is not important to the Invention provided that the fibers do not dissolve under bottomhole conditions before a mat or web of fibers has formed and trapped the mixture of particles. In fact, fibers described by a manufacturer as insoluble may be insoluble at room temperature but dissolve within a few minutes at downhole temperatures; this may be advantageous if the mudcake is later to be removed.

In another embodiment for water-based muds, the blend of fibers is a blend of two different rigid fibers, for example water-insoluble polyvinyl alcohol. The two different fibers may differ in length (for example about 8 mm and about 12 mm or 6 mm and 12 mm), in diameter (for example selected from about 40, about 100 and about 200 microns), or in rigidity (tensile strength).

In one embodiment for water-based muds, preferred fibers are acid soluble fibers that have good performance in highly alkaline environments. Formations having even severe losses can thus be treated with water-based systems. We define acid-soluble as soluble in an aqueous acid solution commonly injected into wells in the oilfield, for example formic acid, acetic acid, citric acid, hydrochloric acid (for example 3 percent or 25 percent), or mixtures of these. The fibers are therefore subsequently removable with HCl, for example 15% HCl, if it is desirable to remove the mud cake. When some or all of the particulate solids includes carbonate solids, they too are acidizable. In general, the higher the content of particulate solids, the more effective is the mud cake at blocking fractures and high permeability or unconsolidated regions.

One preferable long rigid organic fiber for water-based muds is a nonwater-soluble polyvinyl alcohol fiber. The length of these fibers is preferably in the range of about 10 to about 15 mm, more preferably about 12 mm. The diameter of these fibers is preferably about 0.04 mm to 0.2 mm, the tensile strength preferably about 1000 N/mm$^2$ (1.0 GPa), and the elongation preferably about 8 kN/mm$^2$. Preferred polyvinyl alcohol fibers have a thermal decomposition temperature typical of bottom hole conditions, for example around 220° C.; at this temperature the polyvinyl alcohol polymer reacts readily with water. Such fibers may be obtained from Kuraray Inc., Osaka, Japan.

In one preferred embodiment for water-based muds the flexible fiber may be an inorganic mineral fiber largely composed of CaO and SiO$_2$, and also typically containing significant amounts of Al$_2$O$_3$, MgO, and Fe$_2$O$_3$, commonly coated with a monomolecular film of specially formulated surfactant to ease the separation of fibers when they are added to water (improve the dispersion). Such a fiber is MAGMA™ fiber available from Lost Circulation Specialists, Inc., Casper, Wyo., USA. This fiber is acid-soluble and thermally stable at temperatures up to 1,800 degrees. The specific gravity of those fibers is 2.6 with no tendency to float. MAGMA™ fiber is an inert non-damaging material towards the environment with an LC-50 of one million. MAGMA™ fiber is available in a "fine" form having a length of from about 0.1 to about 4 mm and a "regular" form having a length of from about 4 to about 20 mm with an average length of about 10 to about 16 mm. The fiber diameters of both grades of MAGMA™ fiber ranges from about 5 to about 15 microns with an average diameter of about 7 to about 10 microns. MAGMA™ fibers are obtained as mixtures of multiple sizes. Fiber for use in the Invention may optionally be cut from either form as appropriate.

In another preferred embodiment for water-based muds the flexible fiber may be a biodegradable organic fiber, for example polyvinyl alcohol fibers which are soluble in water at high temperatures. Polyvinyl alcohol is available in a series of compositions that are water-soluble at specific temperatures, and soluble in 15% HCl at high temperatures. In highly alkaline media, dissolution of fibers occurs at higher temperatures (approximately 10° C. above the dissolution temperature in neutral water). A preferred mixture of flexible fibers is a blend of two different lengths of fibers made with the same polymer, blended so that they have a length ratio of from about 2 to about 6. Such fibers may be blended at a ratio of about 10:90 wt/wt % to about 90:10 wt/wt % of the fibers of different lengths.

In various preferred embodiments for water-based muds, the flexible fiber is a short cut organic wet pulp type polyaramid material, available as "wet pulp" containing about 4 to 7 percent water or as "yarn", each having a dispersant finish, and suitable for use in aqueous media, for example TWARON™ polyaramid obtained from Teijin, having a broad range of short fiber lengths; the blend of fiber contains two fibers in which the rigid fiber is a non-water-soluble rigid polyvinyl alcohol fiber and the second fiber is an inorganic fiber, for example MAGMA™; the blend of fibers contains two fibers in which one fiber is a non-water-soluble rigid polyvinyl alcohol fiber and one fiber is a water-soluble polyvinyl alcohol fiber that is soluble at high temperature and the length ratio of the rigid to the flexible fibers is from about 1 to about 3; the blend of fibers is a blend of three fibers in which one is a rigid fiber that is non-water-soluble polyvinyl alcohol fiber and the other two fibers are short cut polyvinyl alcohol fibers as previously described having different lengths, with length ratios of the flexible fibers ranging between about 2.5 and about 7; the preferred length of the rigid fiber, for example non-water-soluble polyvinyl alcohol fibers, is about 12 mm and the preferred length of the flexible fiber, for example water-soluble polyvinyl alcohol, is between about 1.5 mm and about 6; and the blend of fibers contains two fibers in which the rigid fiber is non-water-soluble polyvinyl alcohol fiber and the other organic fiber is TWARON™ polyaramid "wet pulp" suitable for an aqueous environment.

In one embodiment particularly suited to oil-based muds, the blend of fiber is composed of two fibers. One fiber is rigid and the other is flexible. The rigid fiber is preferably an organic polymer selected from non-water-soluble polyvinyl alcohol and polyaramid. The second fiber is selected from inorganic fibers, preferably a mixture of fine diameter fibers having different short lengths, or organicfibers; the organic fibers are preferably selected from aramid polymer, and watersoluble polyvinyl alcohol polymers that are water-soluble at high temperature.

In another embodiment particularly suited to oil-based muds, the blend of fibers includes three fibers in which one fiber is a long rigid organic fiber and the other two fibers are a different organic fiber and have differing shorter lengths. Preferred fibers are acid-soluble except for polyaramid fibers. However, those fibers have very good performance in highly alkaline environments. The blocking materials preferably are at least partially removable by 15% HCl.

The preferred mixture of solid particles for use with oil-based muds is the same mixture as that used for water-based muds. Preferred fibers for use with oilbased muds include organic and inorganic fibers. The organic fibers may be water-soluble at high temperature or may be non-water-soluble fibers or oil-dispersible fibers. Preferred blends of fibers contain one long rigid fiber with the rest being a shorter more flexible fiber that may be a mixture of lengths.

One preferred long rigid organic fiber for use with oil-based muds is the same as the long rigid organic fiber used with water-based muds, for example nonwater-soluble polyvinyl alcohol fibers as described above. Another preferred long rigid organic fiber for use with oil-based muds is polyaramid polymer fibers such as TECHNORA™ Para-Aramid fibers available from Teijin Aramid Company, Arnhem, The Netherlands. Such fibers are 3,4'-diaminodiphenylether-para-phenylenediamineterephthaloyldichloride copolymers with 3,4'-oxydianilino-para-phenyelenediamineterephthalicacid; they are finished with about 2% of an antistatic additive/lubricant, typically having a decitex of 1.2 to 1.7, a density of 1.39 g/cm$^3$, and a length of 10 to 15 mm. The fibers are about twice as strong as fiber glass and nylon fibers of the same weight. This fiber decomposes at about 500° C., can be used at 200° C. for very long times, and maintains half of its room temperature tensile strength at 250° C. The TECHNORA™ Para-Aramid fibers are typically cut to about 15 mm lengths before use.

One preferred short flexible inorganic fiber for use with oil-based muds is the MAGMA™ fiber, available from Lost Circulation Specialists, Inc., Casper, Wyo., USA, describe above. A preferred short flexible organic fiber for use with oil-based muds is the polyvinyl alcohol fiber which is soluble in water at high temperatures; this was also described in more detail above. Another preferred short flexible organic fiber for use with oil-based muds is short cut polyaramid fibers having a length in the range of from about 0.5 to about 8 mm and a filament diameter of about 12 microns. As an example, such fibers, in the form of chopped yarn bundles of approximately 1 mm diameter, are available commercially from Teijin as TWARON™ 1092 (mean fiber length about 1.4 mm but a fairly broad distribution) and TWARON™ 1094 (bimodal mean fiber lengths of about 0.5 and 1.4 mm but fairly broad distributions). The fibers have a density of 1.44 g/cm$^3$.

In various embodiments suitable for use with oil-based muds, the blend of fiber is composed of two fibers in which one is a rigid fiber that is preferably a non-water-soluble rigid polyvinyl alcohol fiber such as those described above available from Kuraray and the second fiber is an inorganic fiber such as the MAGMA™ also described above; the blend of fiber is composed of two fibers in which one fiber is non-water-soluble rigid polyvinyl alcohol fiber as described above and the other fiber is a water-soluble polyvinyl alcohol fiber that is soluble at high temperature (also described above) and the length ratio of the rigid to the flexible fibers is about 1 to about 3; the blend of fibers includes three fibers in which the rigid fiber is non-water-soluble polyvinyl alcohol fiber as described above and the other two fibers are short cut polyvinyl alcohol fibers as described above in which the short cut fibers have two different lengths with a ratio ranging from about 2.5 to about 7; the preferred lengths of fibers are about 1.5 mm and 6 mm for polyvinyl alcohol water-soluble fibers and 12 mm for polyvinyl alcohol non-water-soluble fibers; the blend of fibers contains two fibers in which the rigid fiber is polyaramid polymer fiber such as the TECHNORA™ Para-Aramid fibers mentioned above and the flexible fiber is short cut polyaramid fiber such as TWARON™ 1092 or TWARON™ 1094.

For either water-based or oil-based muds, other fibers may be used. Laboratory tests should be performed to ensure compatibility with the drilling fluid, that the fluid can transport the fibers at the pumping rates used, and suitability for the size of the openings in the fluid loss pathways to be plugged. Non-limiting examples of other suitable fibers include metals, painted metals, polymer-coated metals, hollow metals, hollow painted metals, hollow coated metals, polypropylene, polyethylene, polyester, polyamide, polylactic acid, polyglycolic acid, polyolefin, novoloid such as phenol-aldehyde, nylon, rayon, extruded mineral wool as described in U.S. Pat. No. 6,790,812, carbon, basalt, asbestos, and glass. Metallic fibers are particularly suitable at high temperatures. Suitable wetting agents may be used to ensure that the materials are oil-wettable in oil-based muds or water-wettable in water-based muds.

In another embodiment for water based and oil based muds, in particular at high temperatures, the rigid fibers may be made of metal that may be coated or non-coated, and the flexible fibers may be fine extruded flexible fibers or, for example, MAGMA™ fiber. The rigid metallic fibers may optionally be hollow, ribbon-shaped or cylindrical, and the short flexible fibers may optionally be fiber mesh.

Embodiments may be further understood from the following examples.

EXAMPLES OF COMPOSITIONS PARTICULARLY SUITED FOR WATER-BASED MUDS

These experiments were performed in a low density water-based mud. The blend of solid particles consisted of coarse calcium carbonate having a particle size of from about 300 to about 1200 microns, medium particles of TWARON™ 5001 polyaramid polymer powder made of poly-paraphenylene-terephthalamide having a bulk density of about 325 kg/m$^3$, and fine calcium carbonate having an average particle size of about 10 microns (MIKHART™ 10 available from, M-I Swaco, Houston, Tex. USA. The coarse/medium/fine ratio was always 55/35/10 weight percent in these experiments.

Figure 2:
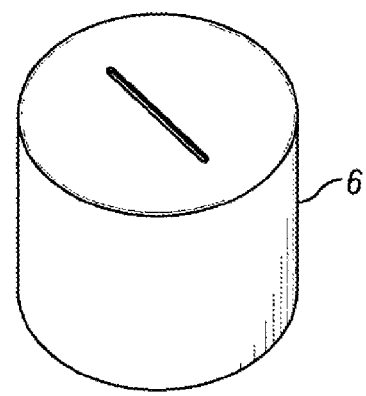
FIG. 2 shows a cylinder containing a slit that mimics a fracture.

All the tests were performed in a modified lost circulation cell, FIG. 1, equipped with one of two modified slits through a cylinder approximately 50 mm high having a 1 mm or 2 mm opening, as shown in FIG. 2. The experimental set up consists essentially of a high-pressure high-temperature fluid loss cell [2] that is equipped with the cylinder [6] at the bottom. Pressure was applied from the top of the cell onto fluid [4] placed in the cell (as in traditional fluid loss experiments). When the cell was ready, a primary pressure of 10 bars was applied and the valve was opened to simulate the differential pressure at two ends of a fracture. The pressure was held for at least 30 minutes. The loss of the mud was monitored by a balance that was connected to a computer. The mud weight vs. time was recorded and plotted. Water-based muds were prepared, allowed to sit for two hours, and then were sheared before addition of any particles or fibers for 10 minutes in a Hamilton Beach mixer (traditionally used for mud preparation for less than 500 mL). Note that the mud was fresh. The muds were not aged because it was assumed that in the field, when mud losses occur, a treatment fluid will be prepared at the site and probably not aged for very long so that it can be used to cure the losses quickly. In any case, the particle sizes of mud additives are not suitable for effective blockage. The mud was then inspected to assure proper blending and proper homogeneity of the mud. Solids were then added with a Heidolph mixer. The rpm was adjusted so that a vortex was observed; 500 rpm was usually suitable. In the first step, typically 10 grams of solid blend was added to 300 mL over the course of 2 minutes to the mud samples. (Different volumes were occasionally used because of the limitations of certain muds.) The solids were then mixed with the mud for 10 minutes. In the second step, fibers were added to the blend over the course of 2 minutes and left to be blended for an additional 10 minutes for complete dispersion. Checking of the homogeneity of the entire blend is mandatory.

The blend of solid particles was 55:35:10 weight percent of coarse calcium carbonate having an average particle size of 700 microns, polyparaphenylene-terephthalamide, and fine calcium carbonate having an average particle size of 10 microns. This blend of solid particles was added to all the muds used here in an amount of 36.23 kg/m$^3$ (12.7 pounds per barrel) of water-based mud.

Example 1

Tests of Examples 1 through 5 were performed with 1.14 kg/L (9.50 lbm/gal) water-based mud. The water-based mud was composed of 3.4 g/L FLOVIS™ xanthan viscosifier available from M-I Swaco, 10.86 g/L DUALFLO™ modified starch available from M-I Swaco, 3.15 g/L magnesium oxide, 31 g/L KCl, 40 g/L HYMOD PRIMA™ ball clay available from Imerys Minerals, Par, England, and was weighted with barite.

To the water-based mud (containing the solid particles), was added 5.70 kg/m3 (2 lbm/bbl) polyvinyl alcohol fibers soluble in water at high temperature, half of which had a length of about 1.5 mm and half of which had a length of about 6 mm (KURALON™ WN8 fiber mixture available from Kuraray, Osaka, Japan) and 5.70 kg/m3 (2 lbm/bbl) non-water-soluble polyvinyl alcohol having a length of about 12 mm (KURALON™ RF400 fiber available from Kuraray, Osaka, Japan). A 343 g portion of the mud/solids/fibers system was poured into the lost circulation cell, and under a 6.89 bar (100 psi) differential pressure, the slurry quickly blocked the modified 2 mm slit. As was typical for successful blockage, the bulk of the fluid loss occurred when the pressure was first applied; within seconds the effluent changed from the appearance of mud to the appearance of water. The amount of mud lost was 76 g.

Example 2

To the water-based mud above (containing the solid particles), was added 2.85 kg/m$^3$ (1.0 lbm/bbl) polyvinyl alcohol fibers soluble in water at high temperature, half of which had a length of about 1.5 mm and half of which had a length of about 6 mm (KURALON™ WN8 fiber mixture available from Kuraray, Osaka, Japan), and 8.55 kg/m3 (3 lbm/bbl) non-water-soluble polyvinyl alcohol having a length of about 12 mm (KURALON™ RF400 fiber available from Kuraray, Osaka, Japan). A 343 g portion of the mud/solids/fibers system was poured into the lost circulation cell, and under a 6.89 bar (100 psi) differential pressure, the slurry blocked the modified 1 mm slit. The amount of mud lost was 11 g.

Example 3

To the water-based mud above (containing the solid particles), was added 8.55 kg/m$^3$ (3 lbm/bbl) long flexible "regular" MAGMA™ fiber (available from Lost Circulation Specialists, Inc., Casper, Wyo., USA) (described above) and 8.55 kg/m$^3$ (3 lbm/bbl) non-water-soluble polyvinyl alcohol having a length of about 12 mm (KURALON™ RF400 fiber available from Kuraray, Osaka, Japan). A 320 g portion of the mud/solids/fibers system was poured into the lost circulation cell, and under a 6.89 bar (100 psi) differential pressure, the slurry blocked the modified 1 mm slit blockage after 9 g of mud loss.

Example 4

To the water-based mud above (containing the solid particles), was added 8.55 kg/m$^3$ (3 lbm/bbl) long flexible "regular" MAGMA™ fiber (available from Lost Circulation Specialists, Inc., Casper, Wyo., USA) (described above), and 8.55 kg/m$^3$ (3 lbm/bbl) non-water-soluble polyvinyl alcohol having a length of about 12 mm (KURALON™ RF400 fiber available from Kuraray, Osaka, Japan). A 322 g portion of the mud/solids/fibers system was poured into the lost circulation cell, and under a 6.89 bar (100 psi) differential pressure, the slurry blocked the modified 2 mm slit blockage after 24 g of mud loss.

Example 5

To the water-based mud above (containing the solid particles), was added 2.85 kg/m$^3$ (1.0 lbm/bbl) polyvinyl alcohol fibers soluble in water at high temperature, half of which had a length of about 1.5 mm and half of which had a length of about 6 mm (KURALON™ WN8 fiber mixture available from Kuraray, Osaka, Japan) and 8.55 kg/m$^3$ (3 lbm/bbl) non-water-soluble polyvinyl alcohol having a length of about 12 mm (KURALON™ RF400 fiber available from Kuraray, Osaka, Japan). A 313 g portion of the mud/solids/fibers system was poured into the lost circulation cell, and under a 6.89 bar (100 psi) differential pressure, the slurry blocked the modified 2 mm slit. The amount of mud lost was 53 g.

Example 6

The mud used to prepare the mud cake was a bentonite mud having a density of 1.65 kg/L (13.8 lbm/gal). It contained 412.5 g/L of bentonite gel (which in turn was 85.6 kg/m$^3$ (30 lbm/bbl) bentonite in water) and 830 g/L of barite in water. Two mud cakes were made with this mud and with the addition of one or the other of two types of flexible fiber to this mud. The fibers used with this mud for preparation of mud cakes were glass fibers (about 20 microns in diameter) cut in the laboratory into approximately 1-2 mm lengths, and "regular" MAGMA™ fiber. The amounts of the MAGMA™ fiber and glass fiber added to the mud in two experiments were 14.98 and 14.27 kg/m$^3$ (5.25 and 5.00 lbm/bbl), respectively.

The mud cakes were prepared in a cell under a pressure of 10 bar (a little above the 6.89 bar (100 psi) pressure used in the API Fluid Loss test for mud (ARTC-LP-070)). The prepared mud cakes were tested by an injection test to evaluate the mud cakes' resistance to deformation and their injectability into a small opening. These properties were measured by testing the mud cakes' resistance to deformation as the result of force exerted on the mud cakes to deform and inject them into a narrow tip. An increase in the energy required to deform a mud cake is related to an increase in the strength of the mud cakes' structure. The sampling equipment for the injection tests was a 5 mL syringe having a metallic piston; the tip of the syringe was removed and replaced with a threaded tip having an internal hole with nominal dimensions of 4.15 mm diameter and 33.30 mm length. With the piston in the syringe but the threaded tip not on, the open end of the syringe was gently pushed into the mud cake so that mud cake entered the syringe and pushed up the piston. The threaded tip was then placed on the syringe after the mud cake was in place. The syringe was then mounted in a frame for stability and pressure was slowly exerted on the piston with a device that could measure the force as a function of time and distance. The force compressed the sample and the mud flowed into the threaded tip; filling of the tip was assured by loosely placing a small screw having a hole in the middle (approximately 2.1 mm) on the end of the threaded tip to produce an additional resistance for the mud cake, causing the mud cake to occupy the entire volume of the tip. After ensuring proper filling of the tip, the screw was removed and the process was continued. As the piston moved downward and approached the bottom of the syringe, the pressure in the tip was increased steadily up to the measurement limit of 800 N.

Figure 3:
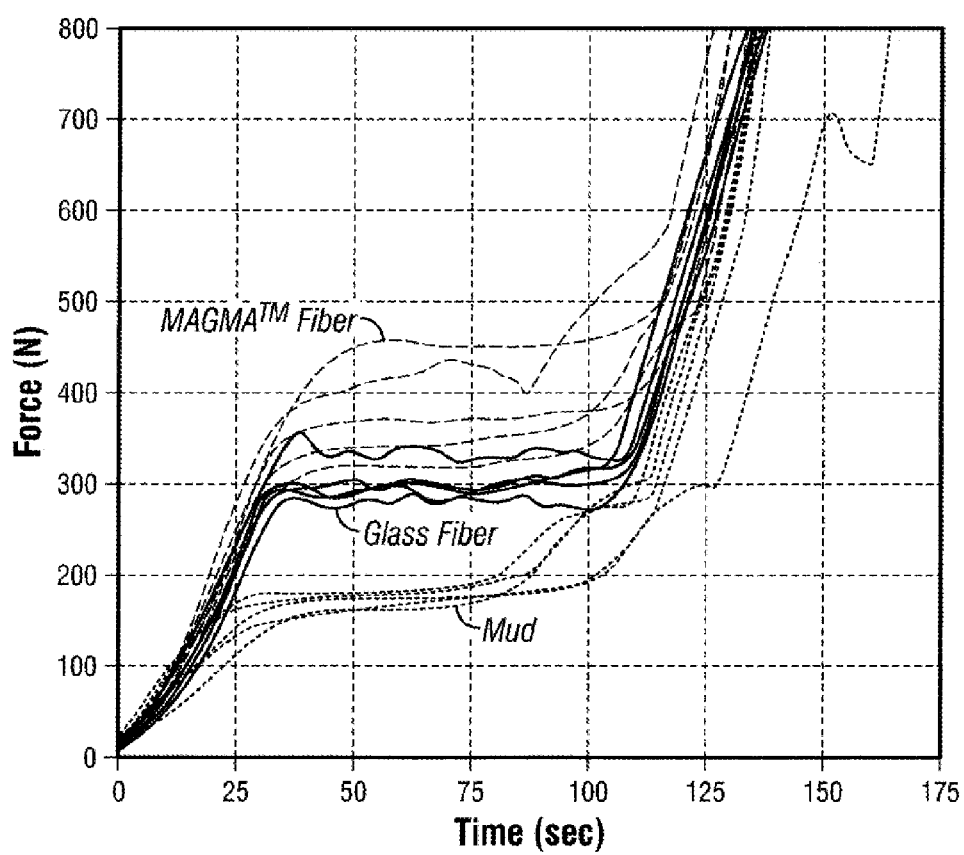
FIG. 3 illustrates the injection force required to deform mud cakes formed by a bentonite mud cake and bentonite mud cakes prepared with different fibers.

FIG. 3 shows the injection profile and the force required to inject mud cake samples, made from the bentonite mud with and without glass or MAGMA™ fiber, into a narrow tip are shown. Mud cake made from the bentonite mud was injected much more easily into the tip than the mud cakes that contained fibers. The mud cake that contained "regular" MAGMA™ fiber required more force to be injected into the tip in comparison to the mud cake containing the glass fibers. The presence of different lengths of the MAGMA™ fibers (in the as-received material) with their small diameters was responsible for the creation of a stronger three-dimensional structure and greater heterogeneity in the mud cake compared to the mud cake made with the glass fibers. All of the injection profiles showed plateaus. Not intending to be limited by theory, it is believed that an approximately horizontal plateau indicates either shearing of successive layers of the sample or a combination of simultaneous shearing, extrusion and adhesion. Less reproducibility was observed with the mud cakes containing the MAGMA™ fiber because of the very random distribution of fibers and their orientation. The glass fibers had a more uniform length. Longer lengths of glass fibers (10 mm) were tried but were not injectable through the small nozzle being used; therefore the resistance increased with the length of the fiber.

Examples of Compositions Particularly Suited for Oil-Based Muds

The following experiments were performed with a synthetic oil-based mud. All tests with the oil-based mud used the same blend of solid particulates as used in the experiments with the water-based mud and the same modified lost circulation cell equipped with the 1 mm modified slit.

Tests were performed using a 1.51 kg/L (12.5 lbm/gal) oil-based mud. The mud is an ester-based synthetic fluid (base fluid ECOGREEN™ B, esters of natural fatty acids such as palm, coconut and fish oils, and ethanol) and is made using 15 L/m$^3$. ECOGREEN™ P surfactant that is the primary emulsifier (available from M-I Swaco) that forms a tight, stable brine-in-ester fluid, 12.1 kg/m$^3$ ECOGREEN™ S multifunctional aliphatic ester that performs as a secondary emulsifier (available from M-I Swaco), 10 kg/m$^3$, ECOGREEN™ F fluid loss control agent (available from M-I Swaco), 4 kg/m$^3$ VG PLUS™ organophilic bentonite clay available from M-I Swaco, 60 kg/m³ CaCl₂, 20 kg/m³ lime, and barite to mud weight.

Example 7

To the oil-based mud just described was added 2.85 kg/m3 (1.0 lbm/bbl) TECHNORA™ Para-Aramid rigid fiber cut to about 1 mm length and 2.85 kg/m³ (1.0 lbm/bbl) flexible TWARON™ polyaramid fiber, cut to approximately 8-10 mm length. A 475 g portion of the mud/solids/fibers system was poured into the lost circulation cell, and under a 6.89 bar (100 psi) differential pressure, the slurry blocked the modified 1 mm slit after 257 g of mud loss. Note that in this example, the flexible fibers were the long fibers and the rigid fibers were the short fibers. The treatment was not as effective as were the treatments in the other examples, in which the longer fibers were rigid and the shorter fibers were flexible, but it did work.

Example 8

To the oil-based mud just described was added 2.85 kg/m³ (1.0 lbm/bbl) flexible polyvinyl alcohol water-soluble at high temperature (previously described) cut to about 1.5 mm length, 2.85 kg/m³ (1.0 lbm/bbl) of the same polyvinyl alcohol water-soluble at high temperature cut to about 6 mm length, and 5.70 kg/m3 (2 lbm/bbl) non-water-soluble rigid polyvinyl alcohol (previously described) cut to about 12 mm. A 500 g portion of the mud/solids/fibers system was poured into the lost circulation cell, and under a 6.89 bar (100 psi) differential pressure, the slurry blocked the modified 1 mm slit; the mud loss was 7 g.

Example 9

To the oil-based mud just described was added 8.55 kg/m³ (3.0 lbm/bbl) MAGMA™ fiber (described above) and 8.55 kg/m³ (3.0 lbm/bbl) non-water-soluble polyvinyl alcohol, as described above, cut to 12 mm length. A 482 g portion of the mud/solids/fibers system was poured into the lost circulation cell, and under a 6.89 bar (100 psi) differential pressure, the slurry blocked the modified 1 mm slit the mud loss was 14 g.

The Invention is applicable to wells of any orientation. The Invention may be used for wells for production of hydrocarbons or other fluids, such as water or carbon dioxide, or, for example, for injection or storage wells.

The invention claimed is:

1. A method for reducing lost circulation in a well comprising:
   (i) adding to an aqueous drilling fluid a composition comprising:
      (1) a mixture of coarse particles having an average particle size between 300 and 1200 μm, medium particles having an average particle size between 20 and 150 μm and optionally fine particles having an average particle size between 5 and 15 μm; and
      (2) a blend of long fibers having an average length between 8 and 15 mm, and short fibers having an average length between 1 and 8 mm; and
   (ii) circulating the drilling fluid in and out of the well.

2. The method of claim 1, wherein the particle mixture comprises from 0 to 15 weight percent fine particles, 20 to 40 weight percent medium particles, and 40 to 60 weight percent coarse particles.

3. The method of claim 1, wherein the particles are selected from the group consisting of alkaline earth carbonates, poly-paraphenyleneterephthalamide, mica, rubber, polyethylene, polypropylene, polystyrene, poly(styrenebutadiene, fly ash, silica, mica, alumina, glass, barite, ceramic, metals and metal oxides, starch and modified starch, hematite, ilmenite, microspheres, glass microspheres, magnesium oxide, gilsonite, sand, and mixtures thereof.

4. The method of claim 1, wherein the particle mixture comprises 8 to 12 weight percent fine calcium carbonate, 30 to 40 weight percent poly-paraphenyleneterephthalamide, mica or calcium carbonate, and 45 to 60 weight percent coarse calcium carbonate.

5. The method of claim 1, wherein the fibers are selected from the group consisting of polyvinyl alcohol, polyamide, aramid, para-aramid, polylactic acid, polyglycolic acid, metals, painted metals, polymer-coated metals, hollow metals, hollow painted metals, hollow coated metals, polypropylene, polyethylene, polyester, polyamide, polyolefin, novoloid, phenol-aldehyde, nylon, rayon, extruded mineral wool, carbon, basalt, asbestos, and glass.

6. The method of claim 1, wherein the weight ratio of long fibers to short fibers is from 1:4 to 4:1.

7. The method of claim 1, wherein the length ratio of long fibers to short fibers is from 1:1 to 3:1.

8. The method of claim 1, wherein at least a portion of the fibers is acid soluble.

9. The method of claim 1, wherein the long fibers comprise water insoluble polyvinyl alcohol and the short fibers comprise water-soluble polyvinyl alcohol.

10. The method of claim 1, wherein the short fibers comprise a mixture of fibers of two different lengths.

11. The method of claim 1, wherein the short fibers comprise a mixture of two different lengths of polyvinyl alcohol fibers.

12. The method of claim 1, wherein the short fibers comprise a mixture of multiple lengths of polyaramid fibers.

13. The method of claim 1, wherein the particle mixture is added to the drilling fluid at a concentration between 2.85 kg/m³ and 130 kg/m³.

14. The method of claim 1, wherein the blend of fibers is added to the drilling fluid at a concentration between 14 kg/m³ and 42 kg/m³.

15. The method of claim 1, wherein at least a portion of the fibers is coated with a material that improves the dispersion of the fibers in the drilling fluid.

16. The method of claim 1, wherein the long fibers comprise water-insoluble polyvinyl alcohol and the short fibers comprise polyaramid fibers, water soluble polyvinyl alcohol fibers, or inorganic mineral fibers.

17. The method of claim 1, wherein the long fibers comprise polyaramid fibers or polyvinyl alcohol fibers.

18. The method of claim 1, wherein the short fibers comprise a mixture of two different lengths or a mixture of multiple lengths of fibers.

19. The method of claim 1, wherein both the long fibers and the short fibers comprise polyvinyl alcohol fibers.

20. The method of claim 1, wherein at least one fiber type has a Young's modulus higher than 20 GPa.

* * * * *